June 8, 1943.  D. E. LEWIS  2,321,219
RODENT TRAP
Filed Nov. 9, 1942

INVENTOR.
DAVID E. LEWIS,
BY Hazard & Miller
ATTORNEY.

Patented June 8, 1943

2,321,219

UNITED STATES PATENT OFFICE 2,321,219

RODENT TRAP

David E. Lewis, San Fernando, Calif.

Application November 9, 1942, Serial No. 464,960

1 Claim. (Cl. 43—81)

This invention relates to improvements in rodent traps.

The trap embodying the present invention has been primarily designed for trapping pocket gophers, although it may be suitably employed for other rodents such as moles and ground squirrels.

A primary object of the invention is to provide a trap which is readily adjustable so that it may accommodate itself to the size of the hole in which the trap is to be installed. The average size of a gopher hole is approximately 2" in diameter but there is some variation. Traps heretofore designed are generally non-adjustable as to width. Consequently, if the diameter of the hole happens to be slightly smaller than the width of the trap when the trap is in set position the hole must be enlarged to accommodate the trap. The enlargement of the hole tends to make the gopher wary and thus avoid the trap. Also, as a gopher on refilling an open gopher hole to protect itself from its natural enemies usually braces his back against the roof or top of the hole in pushing dirt toward the hole entrance, the usual procedure in an enlarged hole is to fill up the bottom of the hole with loose dirt to such an elevation that he may brace his back against the top of the hole. This covering of the bottom of the hole is apt to cover the trap installed in an enlarged hole.

By means of the present invention it is unnecessary to enlarge any ordinary gopher hole in order to install the set trap therein. Instead, by the free adjustment of the trap the trap is caused to accommodate itself and fit the hole as formed by the gopher.

Another object of the invention is to provide a trap having a movable or rotatable jaw which can be adjusted to any desired position when the trap is set between fully closed and fully open position, the movable jaw having a part or arm disposed in the path of a spring so as to be engageable thereby when the spring is released so that the jaw will be urged to close.

In prior traps, the jaw of the trap and the spring that urges the jaw to close are at all times operatively connected together so that the position of the jaw in set position is dependent upon the position of the spring when the spring is in set or stressed position. In the trap embodying the present invention the spring occupies a definite position when in set or stressed condition but the jaw and its associated structure is independent of the spring and consequently may assume any position to which it may be adjusted independent of the position of the spring.

Still another object of the invention is to provide a rodent trap wherein the latch of the trap is remote from the jaw of the trap. Many traps heretofore designed have the latch located adjacent to or between movable jaws of the trap with the result that when the trip of the trap releases the latch the latch is thrown upwardly tending to throw the gopher from between the closing jaws. By means of the present construction the latch is remotely located with respect to the jaws and consequently, when it is released it is not effective to throw the gopher clear of the jaw of the trap.

Another object of the invention is to provide a gopher trap which is of relatively simple and inexpensive construction and so designed that only the spring of the trap need be formed of tempered wire whereby remaining parts may be readily spot welded together.

With the foregoing and other objects in view, which will be made manifest in the following detailed description and specifically pointed out in the appended claim, reference is had to the accompanying drawing for an illustrative embodiment of the invention, wherein:

Figure 1:
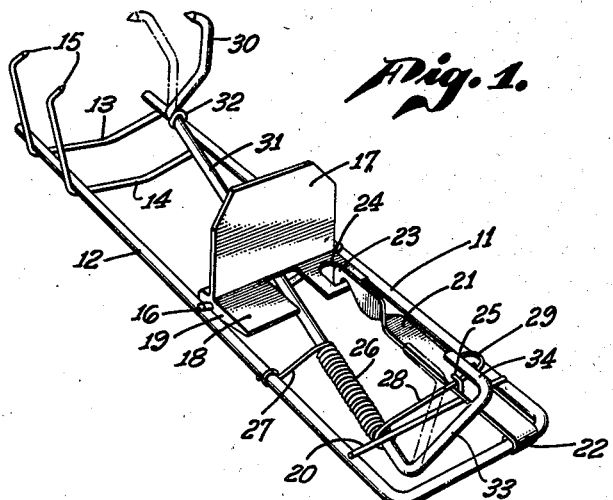
Figure 1 is a perspective view of the improved trap embodying the present invention illustrating the trap in fully open position in full lines and illustrating the movable jaw of the trap in one of the adjusted positions that it may assume.

Referring to the accompanying drawing wherein similar reference characters designate similar parts throughout, the improved trap comprises a frame preferably formed of mild steel wire or the equivalent, bent to provide a cross bar 10 and two forwardly extending arms 11 and 12 which preferably converge slightly toward their forward ends. Adjacent the forward ends of these arms small cross wires 13 and 14 are secured which may be spot welded or otherwise fastened to the arms 11 and 12. These wires may be bent upwardly from the arm 12 and may have their upper ends sharpened as at 15 and cooperatively may form the stationary jaw of the trap. A third wire 16 connects the arms 11 and 12 intermediate the ends of the arms. This wire which may have its ends spot welded or otherwise secured to the arms 11 and 12 provides a pintle for a pivoted trip which is preferably formed of sheet metal to provide an upstanding portion 17, a horizontal portion 18, and downwardly extending flanges 19 in which there are formed apertures to receive the pintle. A fourth wire 20 connects the arms 11 and 12 a short distance forwardly of the cross bar 10 and may be spot welded or otherwise secured to the arms.

As clearly shown upon Fig. 1, the wires 13, 14, and 16 are preferably bent downwardly between the arms 11 and 12 so that the bottom of the trap may largely conform to the shape of the bottom of the gopher hole.

A latch 21 is provided which may be in the form of a strip of sheet metal, one end of which is curled around the cross bar 10 as indicated at 22 so as to pivotally connect the latch thereto. This latch has a hook 23 at its forward end which is engageable with the rear side of an aperture 24 formed in the horizontal portion 18 of the trip. The latch carries a detent 25 engageable with the swinging end of a spring 26. One end of this spring indicated at 27 is stationary and is fastened to the arm 12, in any suitable manner, such as by bending the end of the spring about the arm. The swinging end of the spring indicated at 28 which constitutes the spring arm is adapted to be locked beneath the detent 25 and may have its outer end curled as indicated at 29.

The movable jaw indicated at 30 is formed on the forward end of a diagonally disposed rotatable rod or wire 31. This wire or rod is rotatably fastened to the arm 11, such as by a small wire loop 32 spot welded or otherwise secured thereto. The rod or wire 31 overlies wires 14 and 16 but extends beneath wire 20. It extends through the convolutions of the coil spring 26 and has a laterally bent rear end 33 having a forwardly bent portion 34 that is disposed in the path of the spring arm.

Figure 2:
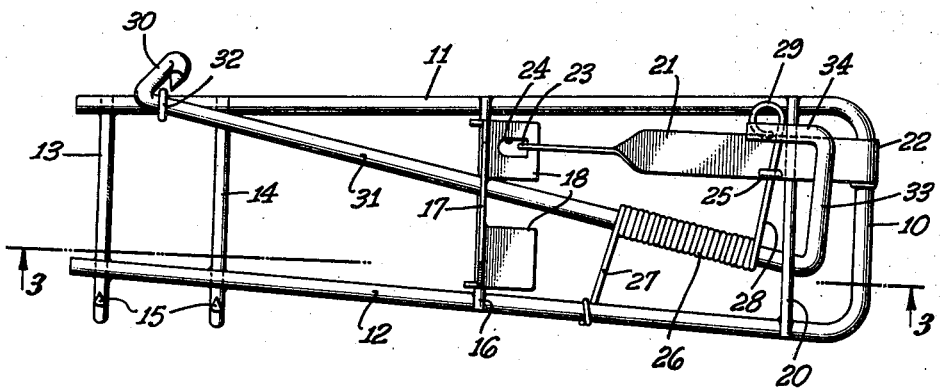
Fig. 2 is a top plan view of the trap shown in Fig. 1.
Figure 3:
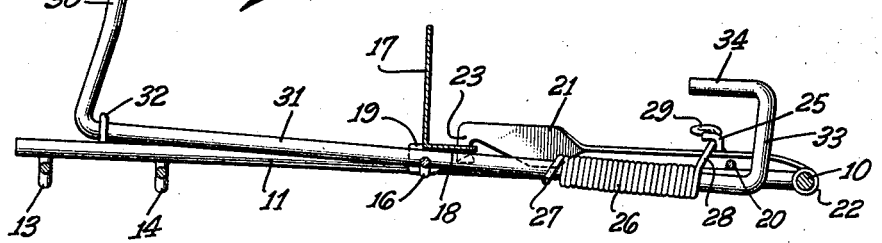
Fig. 3 is a sectional view taken substantially upon the line 3—3 upon Fig. 2 in the direction indicated.

To set the trap the latch 21 is positioned so that its hook 23 engages the rear edge of aperture 24. The spring arm 28 is drawn from its released position wherein it overlies arm 12 to the position shown in Figs. 1 and 2 and is sprung slightly so that it may be positioned beneath the detent 25. With the spring thus held by the latch in stressed and set position the latch is urged upwardly about the cross bar 10 as a center causing the hook 23 to pull the horizontal portion 18 of the trip upwardly about the pintle 16 as a center. The opposed movements of the latch and trip maintain the trap in set condition. The trap may then be inserted into an open gopher hole and after having been so inserted the arm 33 is rotated so as to swing the movable jaw 30 into engagement with the side of the hole. The movable jaw may be opened the full distance, that is, to its fully open position as shown in full lines in Fig. 1. However, if the hole happens to be small, opening movement of the movable jaw may be arrested by the side of the hole short of the fully open position, thus opening of the jaw 30 may be arrested by the walls of the hole at a position indicated in dotted lines on Fig. 1. If the jaw is arrested in that position it is allowed to remain in this position. The opposite ends of the spring tend to cause the convolutions of the spring around the wire or rod 31 to bind slightly thereon so that the jaw is frictionally held in whatever position it is adjusted. When the gopher attempts to fill the open hole and encounters the upstanding portion of the trip 17 this portion is pushed rearwardly causing the horizontal portion 18 to release the hook 23 with the result that the latch is swung upwardly by the spring until the detent 25 is disengaged and the spring arm 28 is swung from a position overlying arm 11 toward a position overlying arm 12. During such movement the end of the spring arm engages the forwardly bent portion 34. This may be engaged immediately after release of the spring if the movable jaw 30 is in fully open position. On the other hand, if the movable jaw is in only partially open position the spring arm 28 will not engage the forwardly bent portion 34 until part of the movement of the spring arm has been completed. Thus, regardless of the position assumed by the movable jaw 30 it will be picked up and carried to closing position by the spring arm. The movable jaw and stationary jaws are illustrated as being pointed and when pointed the gopher may be impaled thereby. However, it is not essential that these jaws be pointed and sharpened inasmuch as the movable jaw may be left blunt. When blunt the movable jaw swings downwardly adjacent the back of the gopher or rodent usually resulting in his back being broken. Consequently, if the rodent's fur is of any value and it is desired to avoid piercing the hide the movable jaw may have a blunt end to avoid piercing the hide, but nevertheless the rodent will be effectively trapped and will not undergo prolonged suffering.

It will be noted from the above-described construction that the latch 21 is not disposed between or adjacent the jaws. Consequently, when the latch is released it is not thrown upwardly against the underside of the gopher and does not tend to throw the gopher from between the closing jaws as in the case of many prior trap constructions. It is also to be noted that in setting the trap those parts that require manipulation are remote from the jaws so that there is no occasion for the person setting the trap to place his hands between or adjacent the jaws during this operation. For this reason the trap is relatively safe even though it may be accidentally sprung during the setting operation.

Inasmuch as the trap may have its spring first set in stressed condition and the movable jaw is independent of the spring in this set or stressed condition the trap may be inserted into the hole and adjusted to fit the hole as distinguished from prior traps wherein the hole is enlarged frequently to fit the trap.

Various changes may be made in the details of construction without departing from the spirit or scope of the invention as defined by the appended claim.

I claim:

A rodent trap comprising a U-shaped wire frame, one or more stationary jaws secured to one of the sides of the frame adjacent the forward end thereof, a movable jaw pivotally mounted upon the opposite side of the frame adjacent the forward end thereof having a rotatable rod or wire extending rearwardly diagonally of the frame, said rod or wire having a crank arm at its rearward end, a coil spring surrounding the rotatable rod adjacent the crank arm having one end anchored to the first-mentioned side of the wire frame and the other end adapted to be sprung into set position and when released to engage the crank arm to urge the movable jaw to close, a cross wire connecting the sides of the wire frame, a trip pivotally mounted thereon, a latch pivotally mounted at the back of the frame having a portion engageable with the trip, said latch having a detent engageable with said other end of the spring whereby when the trip is engaged the latch will be released and will release said other end of the spring to allow it to engage the crank arm to cause the movable jaw to close.

DAVID E. LEWIS.